United States Patent
Lublin et al.

(10) Patent No.: US 11,481,120 B2
(45) Date of Patent: Oct. 25, 2022

(54) REDUCING WEAR ON ZONED STORAGE DEVICES FOR STORING DIGITAL DATA

(71) Applicant: RED HAT, INC., Raleigh, NC (US)

(72) Inventors: Uri Lublin, Raanana (IL); Gabriel Zvi BenHanokh, Tel-Aviv (IL)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 17/106,939

(22) Filed: Nov. 30, 2020

(65) Prior Publication Data

US 2022/0171540 A1  Jun. 2, 2022

(51) Int. Cl.
*G06F 3/06* (2006.01)
*G06F 16/16* (2019.01)

(52) U.S. Cl.
CPC .......... *G06F 3/0616* (2013.01); *G06F 3/0644* (2013.01); *G06F 3/0652* (2013.01); *G06F 3/0673* (2013.01); *G06F 16/162* (2019.01)

(58) Field of Classification Search
CPC .... G06F 3/0616; G06F 3/0644; G06F 3/0652; G06F 3/0673; G06F 16/162
See application file for complete search history.

(56) References Cited

U.S. PATENT DOCUMENTS

| | | |
|---|---|---|
| 8,127,048 B1 | 2/2012 | Merry et al. |
| 8,380,676 B1 | 2/2013 | Eastham et al. |
| 8,959,280 B2 | 2/2015 | Yu et al. |
| 10,417,190 B1 * | 9/2019 | Donlan ................ G06F 16/128 |
| 10,445,229 B1 | 10/2019 | Kuzmin et al. |
| 10,496,456 B2 | 12/2019 | Pradeep et al. |
| 2018/0121459 A1 * | 5/2018 | Sergeev .............. G06F 16/1744 |
| 2020/0349121 A1 * | 11/2020 | Lee ....................... G06F 3/0643 |

FOREIGN PATENT DOCUMENTS

KR   101744017 B1   6/2017

OTHER PUBLICATIONS

"Module ngx http proxy module," nginx, Downloaded 2020, http://nginx.org/en/docs/http/ngx_http_proxy_module.html.
"Tuning your BIND Configuration Effectively for Zone Transfers (Particularly with Many Frequently-Updated Zones)," May 9, 2019, https://kb.isc.org/docs/aa-00726.

* cited by examiner

*Primary Examiner* — Zhuo H Li
(74) *Attorney, Agent, or Firm* — Kilpatrick Townsend & Stockton LLP (57) ABSTRACT

Wear on a zoned storage device can be reduced in some examples. One particular example can involve a system that can receive delete requests configured for erasing multiple files from a zone of a zoned storage device. In response to receiving the deleting requests, the system can update a log to indicate that the multiple files in the zone are to be erased. The system can determine, based on the log, that a predefined amount of data encompassing the multiple files in the zone is to be erased. The system can then transmit a command to the zoned storage device for causing the predefined amount of data in the zone to be erased. Erasing the data in this way may reduce write amplification and thereby increase the longevity of the zoned storage device.

19 Claims, 5 Drawing Sheets

---

502
In response to receiving delete requests configured for erasing multiple files from a zone of a zoned storage device, update a log to indicate that the multiple files in the zone are to be erased

↓

504
Determine, based on the log, that a predefined amount of data encompassing the multiple files in the zone is to be erased

↓

506
Based on determining that the predefined amount of data is to be erased, transmit a command to the zoned storage device for causing the predefined amount of data in the zone to be erased

REDUCING WEAR ON ZONED STORAGE DEVICES FOR STORING DIGITAL DATA

TECHNICAL FIELD

The present disclosure relates generally to zoned storage devices for storing digital data. More specifically, but not by way of limitation, this disclosure relates to reducing wear on zoned storage devices for storing digital data.

BACKGROUND

Zoned storage devices are a class of flash storage devices (storage devices that use flash memory chips for storing data) with an address space that is divided into distinct zones, where each zone spans a contiguous range of data blocks on the storage device. One example of a zoned storage device can be a zoned namespace (ZNS) solid-state drive (SSD). Zoned storage devices have certain write constraints. One write constraint is that data must be written to a zone in a sequential manner. Each zone of the address space can have a write pointer that keeps track of the position of the next write, so that data is written sequentially to the zone. Another write constraint is that old data in a zone cannot be directly overwritten with new data, due to the way flash memory works. The old data must first be erased before the new data can be written. In general, much larger portions of flash memory are erased and rewritten than is actually required by the amount of new data.

DETAILED DESCRIPTION

Computing devices can execute software applications that may store large amounts of data on a zoned storage device. Some of that data may be transitory in nature. For example, a software application can generate temporary files that are ephemeral in nature and designed to be removed from the storage device upon completion of a specific task by the software application. Examples of such temporary files can include compilation files, build artifacts, 3D rendering files, indexing files, etc. Such transitory data may be repeatedly generated by the software application, written to the zoned storage device, and erased from the zoned storage device shortly thereafter. Repeatedly writing and erasing data blocks of a zoned storage device can produce significant write amplification. Write amplification is an undesirable phenomenon in which the actual amount of data physically written to a storage device is a multiple of the logical amount intended to be written. This multiplying effect yields more writes in a shorter timeframe, which in turn shortens the lifespan of a flash storage device, since flash storage devices can only endure a limited number (e.g., 100,000) of write cycles before becoming unreliable. While write amplification is particularly pronounced with respect to transitory data like temporary files, it can also occur with other types of data stored on a zoned storage device, reducing the lifespan of the zoned storage device.

Some examples of the present disclosure can overcome one or more of the abovementioned problems by changing how data is erased from a zoned storage device to reduce write amplification, which in turn can increase the longevity of the zoned storage device. In particular, a system of the present disclosure can receive a delete request from a software application for erasing data from a zone of a zoned storage device. But immediately erasing the data from the zone can lead to write amplification, since erasing data from a zoned storage device can involve both erasing the corresponding data blocks as well as reorganizing (e.g., rewriting) other data blocks. To avoid this write amplification, the system can update a log to indicate which data blocks of the zone are to be erased based on the delete request, rather than immediately erasing the data. The system can repeat this process each time it receives a delete request from the software application, until the log indicates that a predefined amount of data in the zone is to be erased. The predefined amount of data may encompass all of the data blocks in the zone or fewer than all of the data blocks in the zone, such as 95% of the data blocks in the zone. In some examples, the predefined amount of data may be user customizable. Once the log indicates that the predefined amount of data in the zone is to be erased, the system can transmit a command (e.g., a single command such as a TRIM command) to the storage device for causing the storage device to erase the predefined amount of data in the zone all at once. As long as the predefined number of blocks spans more than one file in the zone, the amount of write amplification can be reduced, which can dramatically increase the lifespan of the zoned storage device. The system also transmits fewer I/O requests to the zoned storage device, which reduces bus traffic and frees the internal controller of the zoned storage device to focus on other tasks. This can improve the performance of the zoned storage device.

In some examples, the system's ability to mitigate write amplification using the above process may depend on the number of zones on the zoned storage device that are associated with a software application. More specifically, a system of the present disclosure can write data from a software application to multiple zones of a zoned storage device in parallel. For example, the system can respond to write requests from the software application by writing the corresponding data to multiple zones of the zoned storage device in parallel. If the zoned storage device has fewer zones, then the performance of the zoned storage device may suffer because fewer parallel writes are possible. If the zoned storage device has too many zones, then individual zones may not completely fill up with data and the above process (e.g., of waiting until a zone is to be entirely erased before erasing anything in the zone) may not be triggered. Too many zones may also result in a less-efficient storage or more-fragmented data. So, it may be desirable to identify an optimal number of zones that provides a balance between quick parallel writes and amenability to the above process.

In some examples, the system can determine the optimal number of zones. For example, the system can estimate the amount of space on the zoned storage device that will be used by the software application in the future. The system can also determine a zone size, which is the size of a zone of the zoned storage device. Some or all of the zones of the zoned storage device may have the same, fixed size (e.g., they may span the same number of data blocks). The system can then divide the amount of space that will be used by the software application by the zone size to determine the correct number of zones to use. Having determined the optimal number of zones, the system can configure the zoned storage device to use the optimal number of zones with respect to the software application.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
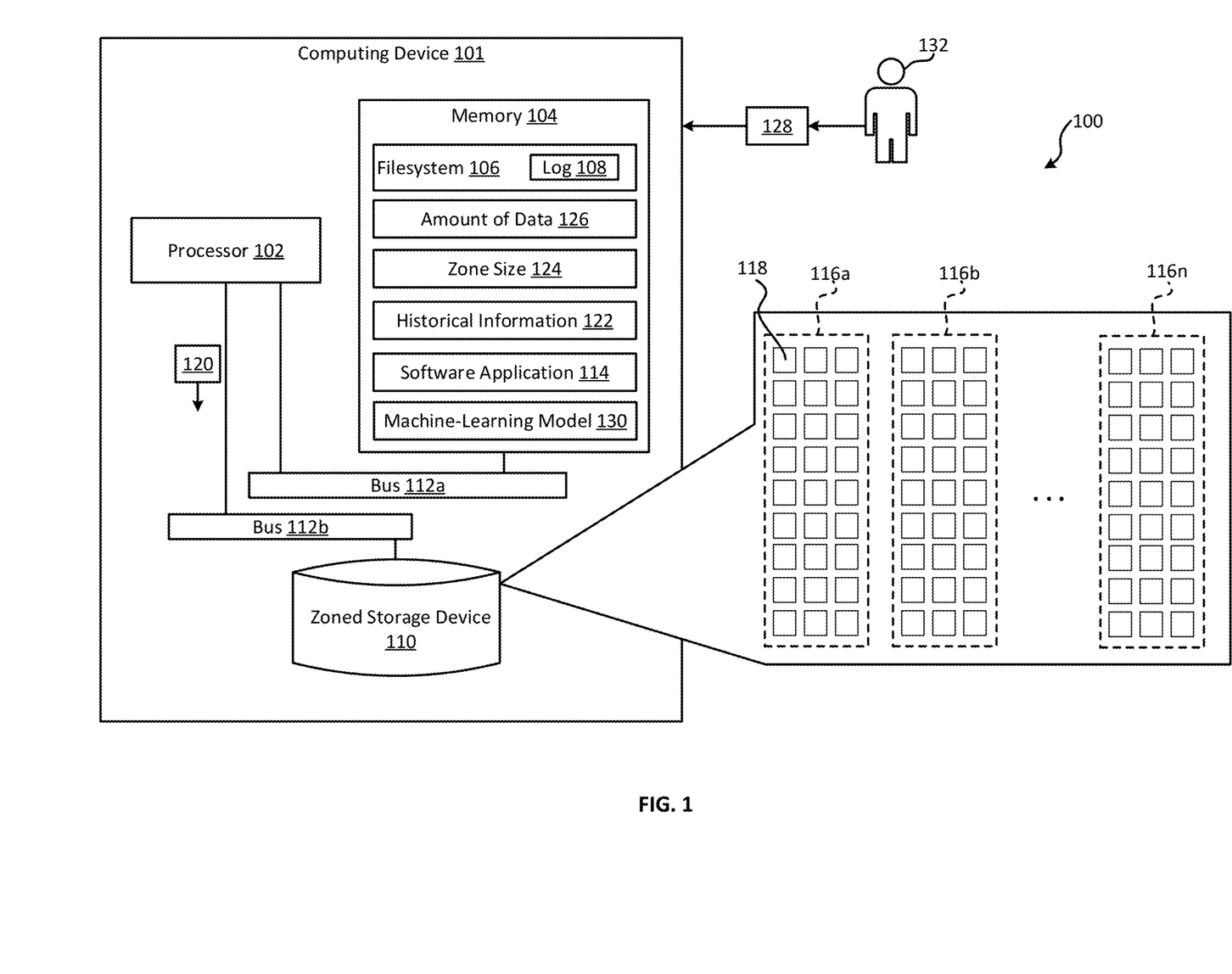
FIG. 1 is a block diagram of an example of a system for reducing wear on zoned storage devices according to some aspects of the present disclosure.

FIG. 1 is a block diagram of an example of a system 100 for reducing wear on zoned storage devices according to some aspects of the present disclosure. The system 100 includes a computing device 101, such as a desktop computer, laptop computer, server, or mobile phone. The computing device 101 includes a processor 102 communicatively coupled to a memory 104 by a bus, such as bus 112a. One example of the processor 102 can be a central processing unit (CPU). The computing device 101 can also include a zoned storage device 110 communicatively coupled to the processor 102 by a bus, such as bus 112b. One example of the zoned storage device 110 can be a zoned namespace (ZNS) solid-state drive. It will be appreciated that although the zoned storage device 110 is shown as internal to the computing device 101 in FIG. 1, in other examples the zoned storage device 110 may be external and communicatively coupled to the computing device 101 via any suitable means of communication.

The computing device 101 can also include a filesystem 106 associated with the zoned storage device 110. The filesystem 106 may be a virtual filesystem, such as a tmpfs filesystem implemented on a Unix-like operating system. Tmpfs is a temporary file storage facility that is designed to appear as a mounted filesystem, but is stored in volatile memory rather than a non-volatile storage device. The filesystem 106 can serve as an interface between software applications on the computing device 101 and the zoned storage device 110. That is, software applications can interact with the filesystem 106 to store data to, and erase data from, the zoned storage device 110.

The computing device 101 can include a software application 114 that may generate temporary files or other data. As the software application 114 generates data, the software application can transmit write requests to the filesystem 106 for storing the data to the zoned storage device 110. The zoned storage device 110 can write the data to one or more zones 116a-n of the zoned storage device 110 that are allocated to the software application 114. For example, the zoned storage device can write the data in parallel to multiple zones 116a-n allocated to the software application 114. It will be appreciated that any number of zones 116a-n can be allocated to the software application 114.

The software application 114 can also transmit a delete request for erasing data (e.g., a file) from a zone 116a of the zoned storage device 110. The software application 114 can transmit the delete request to the filesystem 106 to erase the data. In a conventional arrangement, the computing device 101 may immediately erase the data from the zoned storage device 110 in response to the delete request, for example by immediately transmitting a command 120 to the zoned storage device 110 for deleting the data from the zone 116a. But this can lead to write amplification. To reduce such write amplification, in some examples the computing device 101 can maintain a log 108 of data to be erased from the zone 116a. The log 108 can be part of the filesystem 106 or separate from the filesystem 106. In one example, the log 108 can be a memory mapping indicating logical block addresses of data blocks 118 that are to be erased in the zone 116a. The computing device 101 can receive the delete request from the software application 114 and update the log 108 to reflect that the data associated with the delete request is to be erased, without actually causing the data to be erased from the zoned storage device 110 at that time. For example, the computing device 101 can mark the data (e.g., the data blocks corresponding to the data) as deleted in the log 108. This may prevent the data from being accessed in the future by the software application 114, since the computing device 101 may be configured to prevent data marked as deleted in the log 108 from being supplied to the software application 114, thereby causing the data to be perceived as deleted from the perspective of the software application 114. However, the data may still actually remain on the zoned storage device 110 at that time. The computing device 101 can repeat this process in response to each delete request it receives from the software application 114, updating the log 108 to reflect that the corresponding data is deleted from the zoned storage device 110 without actually erasing the data from the zoned storage device 110 at that time.

As alluded to above, the software application 114 may transmit multiple delete requests for causing various data in the zone 116a to be deleted. In response to each of the delete requests, the computing device 101 can update the log 108 to indicate that the corresponding data is to be erased from the zoned storage device 110. Eventually, the log 108 may indicate that a predefined amount of the data in a zone 116a of the zoned storage device 110 is to be erased. The predefined amount of data can span at least two files in the zone 116, where each file can encompass multiple consecutive data-blocks. The at least two files can be consecutive files in the zone 116a. The predefined amount of data may be user customizable and, in some examples, the predefined amount of data may include all of the data in the zone 116a.

The computing device 101 can access the log 108 and determine based on the log 108 that the predefined amount of the data in the zone 116a is to be erased. In response to making such a determination, the computing device 101 can transmit one or more commands 120 to the zoned storage device 110 for causing the predefined amount of the data in the zone 116a to be erased. In some examples, the command 120 can be a single command for causing the predefined amount of the data blocks 118 in the zone 116a to be erased (e.g., concurrently). One example of such a command 120 can be a TRIM command that is configured to inform the zoned storage device 110 of which data blocks are no longer considered in use and can be erased. By erasing the predefined amount of the data in the zone 116a all at once, the write amplification that typically results from the individual delete requests can be reduced or avoided. In some examples, more write amplification can be avoided if the predefined amount of data encompasses more of the zone 116a. For example, more write amplification can be avoided if the predefined amount of data encompasses all of the data in the zone 116a than if the predefined amount of data encompasses less than all of the data in the zone 116a. But as long as the predefined amount of data spans more than one file, write amplification can be reduced as compared to implementing each individual delete request to separately erase each individual file.

In some examples, the performance of the zoned storage device 110 as well as the effectiveness of the above process may depend on the number of zones on the zoned storage device 110 that are associated with the software application 114. If the zoned storage device 110 has too few zones, then the performance of the zoned storage device 110 may suffer because fewer parallel writes are possible. If the zoned storage device 110 has too many zones, then the individual zones 116a-n may not completely fill up with data and the above process may not be triggered. So, it may be desirable to identify an optimal number of zones that provides a suitable balance between increasing speed via more zones and increasing the effectiveness of the above process via fewer zones.

In some examples, the computing device 101 can determine the optimal number of zones to use with respect to the software application 114. For example, the computing device 101 can determine an estimate of the amount of data 126 to be written to the zoned storage device 110 by the software application 114 in the future. The computing device 101 can also determine a zone size 124 for the zones 116a-n of the zoned storage device 110. The zone size 124 can be a fixed amount of data that is capable of being stored in a single zone. The computing device 101 can then divide the amount of data 126 by the zone size 124 to determine the number of zones to use. As one particular example, the computing device 101 can estimate that the software application 114 will use 5 gigabytes (GB) of data during a future timespan and that each zone has a zone size of 512 megabytes (MB). So, the computing device 101 can divide 5 GB by 512 MB to determine that 10 zones (rounding up) are to be used with respect to the software application 114. The computing device 101 can configure the zoned storage device 110 to use the determined number of zones with respect to the software application 114.

The computing device 101 can estimate the amount of data 126 that the software application 114 will write to the zoned storage device 110 using any number and combination of approaches. For example, a user 132 can supply this information as user input 128. The user 132 may also supply the zone size 124 as user input. As another example, the computing device 101 can estimate the amount of data 126 based on historical information 122 indicating how much data the software application 114 has written to the zoned storage device 110 in the past. The historical information 122 may be accumulated over time by the computing device 101 and/or additional computing devices. The computing device 101 can analyze the historical information 122 to predict the amount of data 126 that the software application 114 will write to the zoned storage device 110 in the future. For example, the computing device 101 can analyze the historical information 122 using a trained machine-learning model 130 to predict the amount of data 126 that the software application 114 will write to the zoned storage device 110 in the future. Examples of the machine-learning model 130 can include a neural networks such as recurrent neural networks, decision trees such as classification and regression trees, classifiers such as naïve bias classifiers and random forest classifiers, or any combination of these.

In some examples, the computing device 101 may be preprogrammed with default values for the amount of data 126 in relation to certain types of software applications. So, the computing device 101 may determine a type of the software application 114 and select a default value corresponding to that software type for use as the amount of data 126. The computing device 101 can determine the type of the software application 114 based on user input 128, a name of the software application 114, a description of the software application, a working directory associated with the software application 114, a name of a first file accessed by the software application 114, or any combination of these. As one particular example, the computing device 101 can determine that the software application 114 is a compiler for compiling source code into an executable file. The computing device 101 can then access a predefined mapping indicating relationships between (i) different types of software applications and (ii) corresponding data usage estimates. Based on the predefined mapping, the computing device 101 can estimate that the compiler will likely generate and store 80 MB worth of temporary files during a future timespan. So, the computing device 101 can use 80 MB as the amount of data 126 when calculating the optimal number of zones to use.

Although FIG. 1 depicts a certain number and arrangement of components for illustrative purposes, other examples can include more components, fewer components, different components, or a different arrangement of the components shown in FIG. 1. And it will be appreciated that although various functionality is described above more generally as being implemented by the computing device 101, such functionality may in actuality be implemented by a combination of one or more hardware components and one or more software components, such as the processor 102 and the filesystem 106. For instance, in some examples the filesystem software may be programmed for causing the processor 102 to perform some or all of the functionality described herein, such as maintaining the log 108 and transmitting the command 120 to the zoned storage device 110 at the appropriate time.

Figure 2:
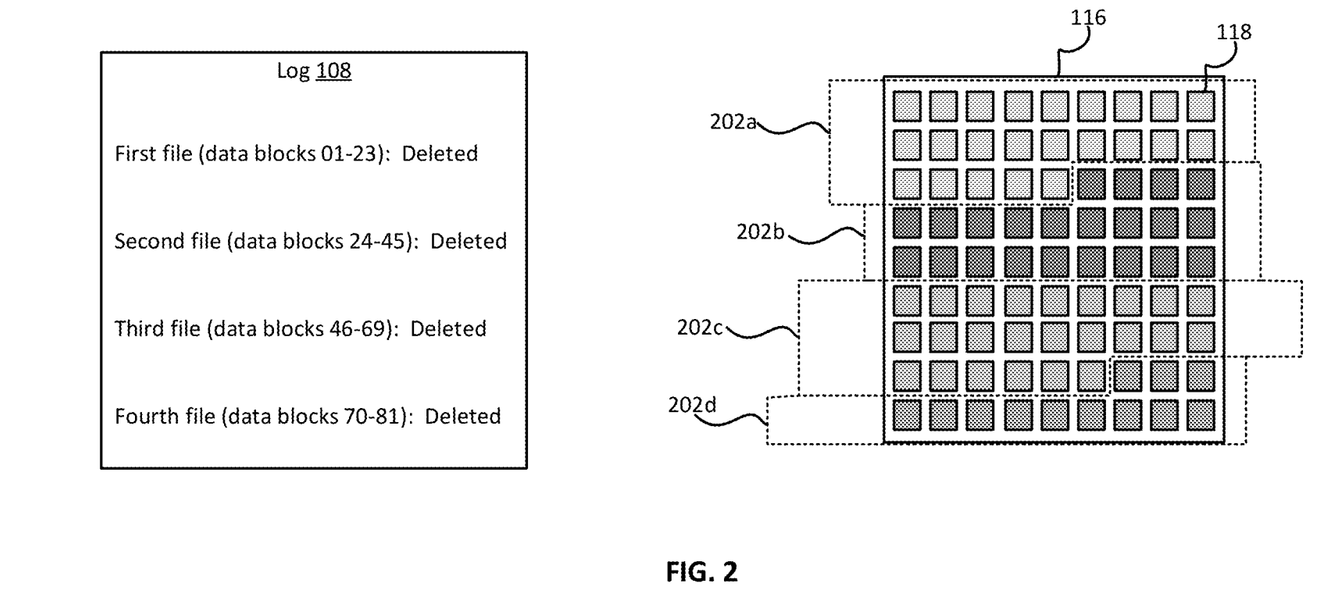
FIG. 2 is a block diagram of an example of a log corresponding to a full zone according to some aspects of the present disclosure.

FIG. 2 is a block diagram of an example of a log 108 corresponding to a full zone (e.g., a zone filled with data) of a zoned storage device according to some examples. In FIG. 2, the zone 116 includes a contiguous range of data blocks 118. Different segments of the zone 116 can correspond to different data objects, where each data object encompasses multiple data blocks. For example, a first set of data blocks 202a can correspond to a first file, a second set of data blocks 202b can correspond to a second file, a third second set of data blocks 202c can correspond to a third file, and fourth set of data blocks 202d can correspond to a fourth file. Of course, this is merely exemplary and the amount of data that can be stored in a zone 116 depends on the zone size.

Figure 3:
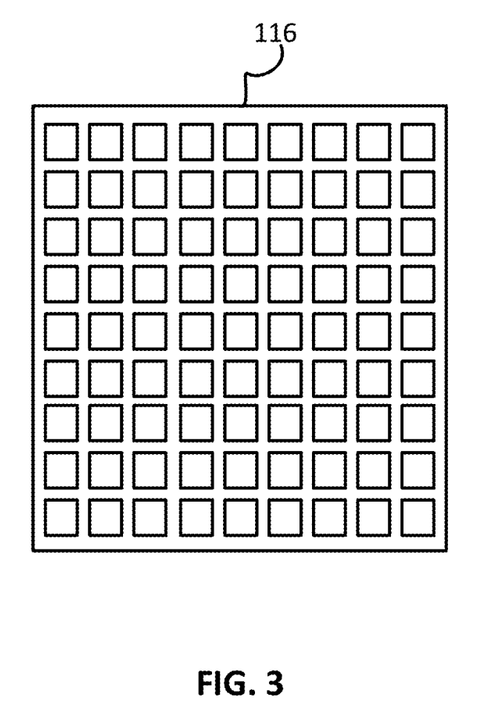
FIG. 3 is a block diagram of an example of an empty zone according to some aspects of the present disclosure.

In some examples, a computing device can receive delete requests from a software application for erasing the data blocks 118 associated with the zone 116. In response to each delete request, the computing device can update a log 108 to indicate that the data blocks corresponding to the delete request are to be erased. For example, in response to receiving a first delete request for erasing the first file corresponding to the first set of data blocks 202a, the computing device can update the log 108 to indicate that the first set of data blocks 202a are to be erased. In response to receiving a second delete request for erasing the second file corresponding to the second set of data blocks 202b, the computing device can update the log 108 to indicate that the second set of data blocks 202b are to be erased. Etc. Once the log 108 indicates that a predefined amount of the data blocks 118 in the zone 116 are to be erased, the computing device 101 can transmit a command to the zoned storage device for causing the predefined amount of data in the zone 116 to be erased (e.g., simultaneously). If the predefined amount of data includes all of the data in the zone 116, then the result will be an empty zone. An example of an empty zone as a result of this process is shown in FIG. 3, in which the empty data blocks are depicted with a white coloring.

Figure 4:
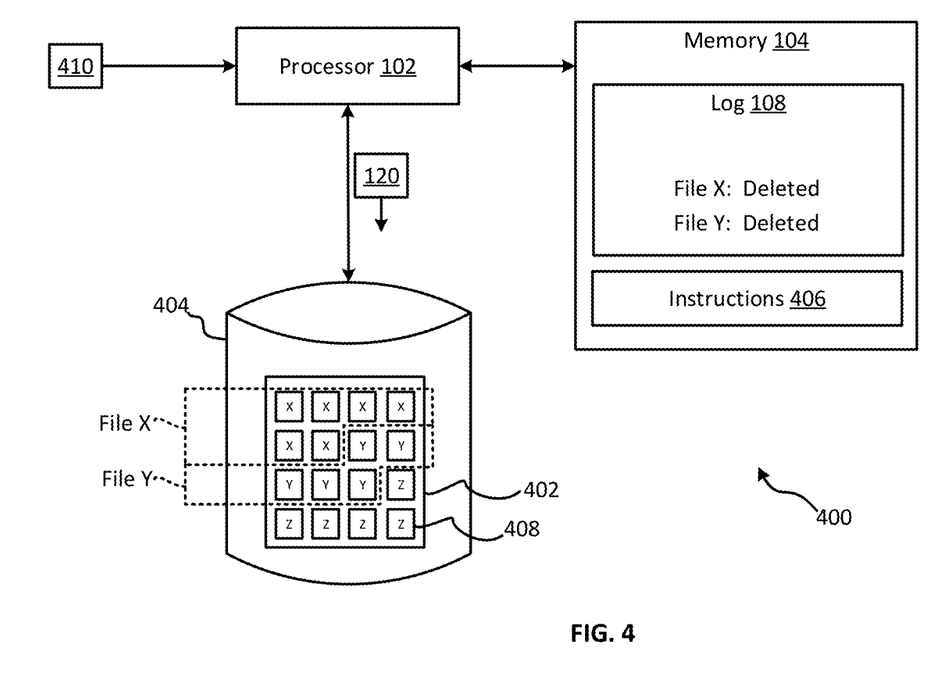
FIG. 4 is a block diagram of another example of a system for reducing wear on zoned storage devices according to some aspects of the present disclosure.

FIG. 4 is a block diagram of another example of a system 400 for reducing wear on zoned storage devices according to some aspects of the present disclosure. The system 400 includes a processor 102 communicatively coupled with a memory 104. In some examples, the processor 102 and the memory 104 can be part of the same computing device, such as the computing device 101 of FIG. 1. In other examples, the processor 102 and the memory 104 can be distributed from (e.g., remote to) one another.

The processor 102 can include one processor or multiple processors. Examples of the processor 102 can include a Field-Programmable Gate Array (FPGA), an application-specific integrated circuit (ASIC), or a microprocessor. The processor 102 can execute instructions 406 stored in the memory 104 to perform operations. The instructions 406 may include processor-specific instructions generated by a compiler or an interpreter from code written in any suitable computer-programming language, such as C, C++, C #, etc.

The memory 104 can include one memory or multiple memories. The memory 104 can be non-volatile and may include any type of memory that retains stored information when powered off. Non-limiting examples of the memory 104 include electrically erasable and programmable read-only memory (EEPROM), flash memory, or any other type of non-volatile memory. At least some of the memory 104 can include a non-transitory computer-readable medium from which the processor 102 can read instructions 406. A computer-readable medium can include electronic, optical, magnetic, or other storage devices capable of providing the processor 102 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 406.

In some examples, the processor 102 can execute instructions 406 to perform various operations. For example, the processor 102 can receive delete requests 410 configured for erasing multiple files from a zone 402 of a zoned storage device 404 (e.g., a flash storage device such as a solid-state drive). Each of the files can span multiple data blocks, such as data block 408, on the zoned storage device 404. For example, the multiple files can include File X that encompasses the data blocks marked with an "X" in FIG. 4. The multiple files can also include File Y that encompasses the data blocks marked with a "Y" in FIG. 4. In response to receiving the delete requests 410, the processor 102 can update a log 108 to indicate that the multiple files in the zone 402 are to be erased. For example, the processor 102 can mark File X and File Y as deleted in the log 108, which may indicate that those files are to be erased.

The processor 102 can monitor the log 108 to determine if a predefined amount of data is flagged therein to be erased. The predefined amount of data can be a threshold amount of data that may be user customizable. In some examples, the predefined amount of data may encompass the multiple files in the zone 402. For example, the predefined amount of data can encompass all of the data blocks marked with "X" and "Y" in FIG. 4. Based on determining that the predefined amount of data is to be erased, the processor 102 can then transmit a command 120 to the zoned storage device 404 for causing the predefined amount of data in the zone 402 to be erased. The zoned storage device 404 (e.g., an internal controller of the zoned storage device 404) can receive the command 120 and responsively erase the predefined amount of data from the zone 402.

Figure 5:
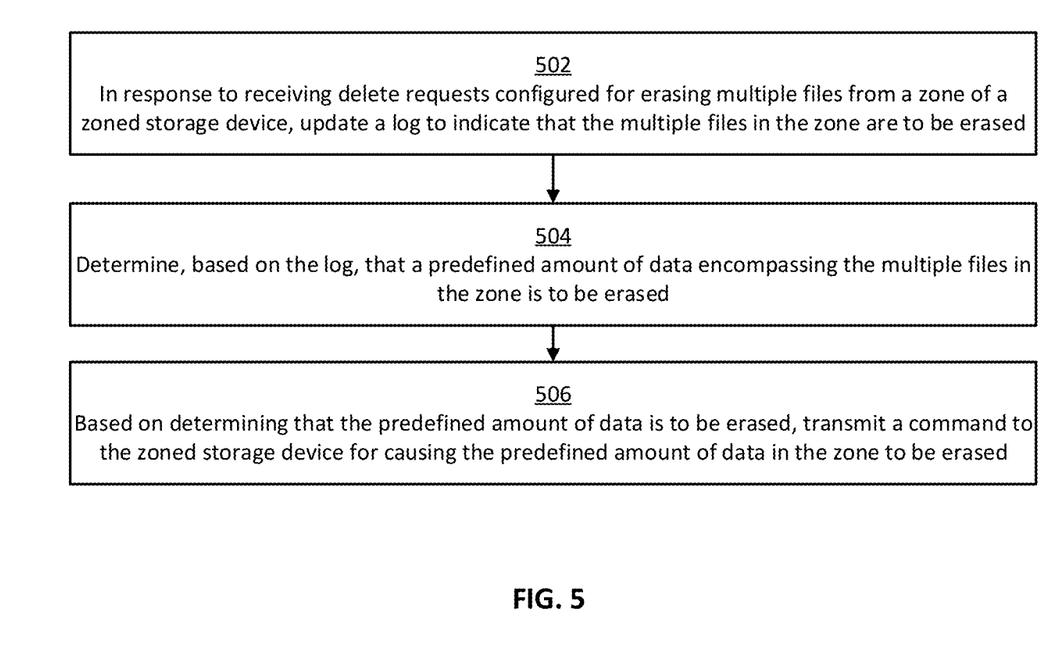
FIG. 5 is a flow chart of an example of a process for reducing wear on zoned storage devices according to some aspects of the present disclosure.

FIG. 5 is a flow chart of an example of a process for reducing wear on zoned storage devices according to some aspects of the present disclosure. Other examples can include more steps, fewer steps, different steps, or a different order of the steps than is shown in FIG. 5. The steps of FIG. 5 are discussed below with reference to the components discussed above in relation to FIG. 4.

In block 502, the processor 102 updates a log 108 to indicate that multiple files in a zone 402 of a zoned storage device 404 are to be erased, in response to receiving delete requests 410 configured for erasing the multiple files from the zone. Updating the log 108 may involve marking those files or corresponding data blocks as deleted. The log 108 may be specific to the zone or include information about multiple zones of the zoned storage device 404.

In block 504, the processor 102 determines, based on the log 108, that a predefined amount of data encompassing the multiple files in the zone 402 is to be erased. For example, the processor 102 can analyze the log 108 to determine if the predefined amount of data is to be erased from the zone 402.

In block 506, the processor 102 transmits a command 120 to the zoned storage device 404 for causing the predefined amount of data in the zone 402 to be erased. The processor 102 can transmit the command 120 based on determining that the predefined amount of data is to be erased. The command 120 may be a single command or may include multiple commands. An internal controller of the zoned storage device 404 can receive the command 120 and responsively erase the predefined amount of the data from the zone 402.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A system comprising:
   a processor; and
   a memory including instructions that are executable by the processor for causing the processor to:
   in response to receiving delete requests configured for erasing multiple files from a zone of a zoned storage device, update a log to indicate that the multiple files in the zone are to be erased;
   prevent the multiple files in the zone from being erased prior to at least a predefined amount of data being marked for deletion in the log;
   determine that at least the predefined amount of data in the zone is marked for deletion in the log, the predefined amount of data encompassing the multiple files; and
   based on determining that at least the predefined amount of data is marked for deletion in the log, transmit a command to the zoned storage device for causing the predefined amount of data in the zone to be erased, the command being a single command.

2. The system of claim 1, wherein the memory further includes instructions that are executable by the processor for causing the processor to:
   receive the delete requests from a software application;

mark the multiple files as deleted in the log in response to receiving the delete requests, wherein marking the multiple files as deleted in the log prevents the multiple files from being accessed by the software application, and wherein marking the multiple files as deleted in the log indicates that a set of data blocks corresponding to the multiple files is to be erased from the zone;
prevent the set of data blocks in the zone from being erased, prior to determining that at least the predefined amount of data in the zone is to be erased; and
in response to determining that at least the predefined amount of data in the zone aye is to be erased, transmit the command to the zoned storage device for causing the set of data blocks to be erased.

3. The system of claim 2, wherein the multiple files include temporary files.

4. The system of claim 1, wherein the processor is a central processing unit that is external to the zoned storage device, wherein the zoned storage device is a zoned namespace (ZNS) solid-state drive (SSD), and wherein the predefined amount of data encompasses all data in the zone.

5. The system of claim 1, wherein the zone is one of a plurality of zones of the zoned storage device, each zone in the plurality of zones spanning a contiguous range of data blocks of the zoned storage device.

6. The system of claim 5, wherein the memory further includes instructions that are executable by the processor for causing the processor to:
receive a plurality of write requests from a software application for writing data; and
in response to receiving the plurality of write requests, write the data to the plurality of zones in parallel.

7. The system of claim 5, wherein the memory further includes instructions that are executable by the processor for causing the processor to:
estimate an amount of data to be written by a software application to the zoned storage device at a future point in time;
determine a zone size for the plurality of zones;
determine a number of zones to generate based on the estimated amount of data to be written and the zone size; and
generate the plurality of zones to consist of the number of zones.

8. The system of claim 7, wherein the memory further includes instructions that are executable by the processor for causing the processor to:
estimate the amount of data to be written based on first user input; and
determine the zone size based on second user input.

9. The system of claim 7, wherein the memory further includes instructions that are executable by the processor for causing the processor to estimate the amount of data to be written by the software application based on historical information indicating how much data was written by the software application during a prior time period.

10. A method comprising:
in response to receiving delete requests configured for erasing multiple files from a zone of a zoned storage device, updating, by a processor, a log to indicate that the multiple files in the zone are to be erased;
preventing, by the processor, the multiple files in the zone from being erased prior to at least a predefined amount of data being marked for deletion in the log;
determining, by the processor, that at least the predefined amount of data in the zone is marked for deletion in the log, the predefined amount of data encompassing the multiple files; and
based on determining that at least the predefined amount of data is marked for deletion in the log, transmitting, by the processor, a command to the zoned storage device for causing the predefined amount of data in the zone to be erased, the command being a single command.

11. The method of claim 10, further comprising:
receiving the delete requests from a software application;
marking the multiple files as deleted in the log in response to receiving the delete requests, wherein marking the multiple files as deleted in the log prevents the multiple files from being accessed by the software application, and wherein marking the multiple files as deleted in the log indicates that a set of data blocks corresponding to the multiple files is to be erased from the zone;
preventing the set of data blocks in the zone from being erased, prior to determining that at least the predefined amount of data in the zone is to be erased; and
in response to determining that at least the predefined amount of data in the zone is to be erased, transmitting the command to the zoned storage device for causing the set of data blocks to be erased.

12. The method of claim 11, wherein the multiple files include temporary files.

13. The method of claim 10, wherein the processor is a central processing unit that is external to the zoned storage device, and wherein the zoned storage device is a zoned namespace (ZNS) solid-state drive (SSD).

14. The method of claim 10, wherein the zone is one of a plurality of zones of the zoned storage device, each zone in the plurality of zones spanning a contiguous range of data blocks of the zoned storage device.

15. The method of claim 14, further comprising:
receiving a plurality of write requests from a software application for writing data; and
in response to receiving the plurality of write requests, writing the data to the plurality of zones in parallel.

16. The method of claim 14, further comprising:
estimating an amount of data to be written by a software application to the zoned storage device at a future point in time;
determining a zone size for the plurality of zones;
determining a number of zones to generate based on the estimated amount of data to be written and the zone size; and
generating the plurality of zones to consist of the number of zones.

17. The method of claim 16, further comprising:
estimating the amount of data to be written based on first user input; and
determining the zone size based on second user input.

18. The method of claim 16, further comprising estimating the amount of data to be written by the software application based on historical information indicating how much data was written by the software application during a prior time period.

19. A non-transitory computer-readable medium comprising program code that is executable by a processor for causing the processor to:
in response to receiving delete requests configured for erasing multiple files from a zone of a zoned storage device, update a log to indicate that the multiple files in the zone are to be erased;

prevent the multiple files in the zone from being erased prior to at least a predefined amount of data being marked for deletion in the log;

determine that at least the predefined amount of data in the zone is marked for deletion in the log, the predefined amount of data encompassing the multiple files; and based on determining that at least the predefined amount of data is marked for deletion in the log, transmit a command to the zoned storage device for causing the predefined amount of data in the zone to be erased.

* * * * *